United States Patent [19]

Orlandi

[11] Patent Number: 4,946,134
[45] Date of Patent: Aug. 7, 1990

[54] PAIR OF COOPERATING DISKS TO CONTROL THE DELIVERY OF LIQUID IN SO-CALLED "SCREW" VALVES

[75] Inventor: Alessio Orlandi, Castiglione D/Stiviere, Italy

[73] Assignee: Galatron S.r.l., Castiglione D/Stiviere, Italy

[21] Appl. No.: 443,934

[22] Filed: Nov. 30, 1989

[30] Foreign Application Priority Data

Dec. 2, 1988 [IT] Italy ................ 7117/88[U]

[51] Int. Cl.⁵ .................................. F16K 5/08
[52] U.S. Cl. ..................... 251/208; 137/625.31; 251/314
[58] Field of Search ............. 137/315, 454.2, 454.5, 137/454.6, 625.31, 603, 605, 801; 251/205, 208, 209, 210, 304, 314, 316, 368

[56] References Cited

U.S. PATENT DOCUMENTS

| | | | |
|---|---|---|---|
| 1,160,864 | 11/1915 | Vaughn | 251/208 |
| 1,191,700 | 7/1916 | Howes | 251/208 |
| 1,751,591 | 3/1930 | McCloskey | 251/208 |
| 3,831,621 | 8/1974 | Anthony et al. | 137/454.6 |
| 3,987,819 | 10/1976 | Scheuermann | 251/208 |
| 4,161,307 | 7/1979 | Clinch et al. | 251/208 |
| 4,327,758 | 5/1982 | Uhlmann | 251/208 |
| 4,331,176 | 5/1982 | Parkison | 137/454.5 |
| 4,544,130 | 10/1985 | Stoll et al. | 251/208 |
| 4,678,002 | 7/1987 | Valley | 137/454.5 |
| 4,793,375 | 12/1988 | Marty | 251/208 |

Primary Examiner—George L. Walton
Attorney, Agent, or Firm—McGlew & Tuttle

[57] ABSTRACT

The object of the invention is a pair of superimposed ceramic disks (11,12) to open and close screw type valves, one of said disks (11) being fixed and the other one (12) being movable on the fixed disk, where each of said disks presents a slot or opening (15,16) composed by a segment portion (15',16') and by a tapered curved portion (15",16") extending from one end of said segment portion, the slot or opening (15) of one disk (11) being turned in a direction which is opposite to the direction of slot (16) in the other disk (12), so that when opening the valve the tapered curved portions (15",16") are the first to superimpose to gradually increase the flow of the delivered liquid.

3 Claims, 1 Drawing Sheet

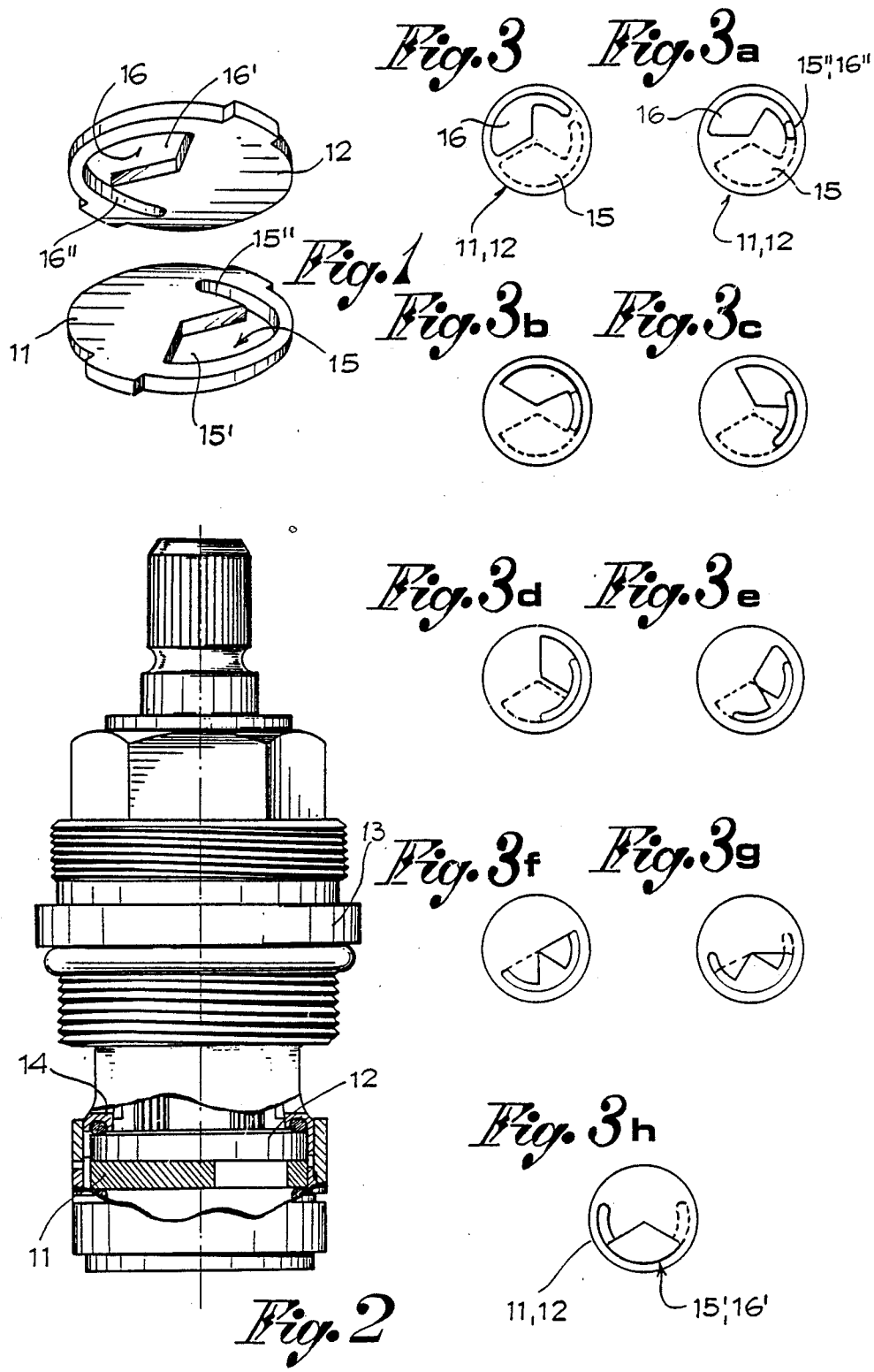

PAIR OF COOPERATING DISKS TO CONTROL THE DELIVERY OF LIQUID IN SO-CALLED "SCREW" VALVES

The present design pattern generally concerns sealing and delivery control elements in valves and in particular in the so-called "screw" type valves with ceramic disks.

In the above quoted screw-valves the use of two superimposed ceramic diks to control its opening and closing in order to regulate the flow of the delivered liquid is already known, said disks having some displaceable openings or slots to space or partially superpose them. To this purpose, one disk is fixed and stationary, while the other one is controlled and displaceable on the fixed one to put its openings or slots either far from or in partial or total correspondence with those in the fixed disk.

According to the standard executions each of said slots or openings in each disk occupies a segment of the surface varying from 90 to 120 degrees, so that a rotation of the same angular amplitude of the movable disk on the fixed one causes the passage from the closing position to that of the complete opening of the valve.

In these conditions the opening and closing of the valve is often too abrupt to allow a gradual and progressive variation and control of the flow of the delivered liquid. In addition, a fast closure of the valve may easily cause some undesirable phenomena and noises in the hydraulic installation, like the water hammer which is actually due to abrupt changes in the delivery and therefore to some sudden changes of pressure.

It is instead the object of the present invention to provide the screw-valves of the above mentioned type with a pair of ceramic disks, both presenting a slot or opening with an angular amplitude and having a particular shape in order to allow:

a more ample rotation (up to 240°) of the movable disk on the fixed one while passing from the closed position to that of full opening;

a progressive and gradual variation of the flow of the delivered liquid; and in consequence the elimination of any kind of water hammer in the hydraulic installation owing to the absence of abrupt pressure changes.

To this purpose both of the superimposed ceramic disks for the opening and closing of the screw type valve, one of which is fixed and the other one is movable, are presenting at least one slot or opening composed by a segment like portion and a tapered and curved portion extending from one end of the segment portion, the slot or opening in one disk extending in a direction which is opposite to that of the other disk, so that during the opening motion the curved and tapered portions of the two disks are the first to superimpose and thus gradually increase the delivey of the liquid and are the last ones to be separated during the closing motion and thus gradually throttle the delivery, the maximum delivery of the fluid being obtained when the two larger segment like portions of the two disks are superimposed.

The enclosed drawing shows an embodiment of the two disks, the details of which will hereinafter be described.

In said drawing:

FIG. 1 shows two separated disks;

FIG. 2 shows a partial section of a valve incorporating the two disks; and

FIGS. 3 to 3h show a sequence of the positions of the slots or openings in the two superimposed disks during the stages of opening and closing of the valve.

According to the invention the two equal disks 11, 12 are superimposed in opposite positions and mounted in a known manner in a screw type valve 13 (see FIG. 2) where the bottom disk 11 is fixed and stationary and the top disk 12 is controlled by an actuator 14 to rotate on the fixed disk.

To allow the delivery of the liquid through the valve, each of the two disks presents an opening or slot 15, 16 which can be reciprocally moved from a spaced position to a partial or total correspondence by rotating the movable disk 11 on the fixed disk 12.

In particular, each slot or opening 15, 16 of each disk 11, 12 is composed of a segment like portion 15', 16' and a narrow and curved portion 15", 16" respectively starting from segment 15', 16'.

In the embodiment shown in the drawing the segment 15', 16' of each slot occupies a sector of 120° approximately and the tapered curved section an angle of 60° approximately, so that the full angular extension of the slot is 180° approximately.

If each disk had two slots each of them would have an extension of nearly 90°, still maintaining a ratio of 2:1 between the segment like portion and the tapered curved portion.

When the two disks 11, 12 are mounted into the valve and superimposed, the slot 15 in the bottom an fixed disk 11 is opposite to slot 16 in the top and movable disk 16. In particular, the tapered curved portion 15" of slot 15 in the fixed disk 11 is turned in a direction which is opposite to the sense of rotation of the movable disk 12 during its opening motion as shown in FIGS. 1 and 3 in the enclosed drawing, while slot 16 in the top disk 12 has its tapered curved end 16" turned in the sense of rotation of the movable disk during the opening motion of the valve.

When the slots 15 and 16 are distant from each other they do not allow any passage of liquid and thus the valve is closed. To open the valve it is enough to turn the movable disk 12 and take its slot 16 towards slot 15 in the fixed disk 11. As shown in the sequence of FIGS. 3a to 3h, the opening takes place gradually, the tapered and curved portions 15", 16" being the first to superimpose, while during the further rotation also segments 15', 16' are superimposing till they are also in full correspondence.

In consequence, during the opening motion the flow is gradually increased till it reaches it maximum when the segment portions 15', 16' are coinciding (see FIG. 3h), the opening being complete, in the illustrated embodiments, when the movable disk has been turned by 240° on the fixed disk. When closing the valve the same stages take place in the opposite sequence, the flow of the liquid being gradually reduced till it is totally interrupted. The whole construction serving the purpose of the invention, even if each disk is provided with two slots of the same shape.

I claim:

1. A pair of superimposed ceramic disks for faucet valves, comprising: a fixed disk having a fixed disk opening passing through the fixed disk with a first arcuate wall cooperating with a second arcuate wall spaced a substantially constant distance from said first arcuate wall to define a slot opening portion having a substantially constant width and cooperating with opposite walls to define an angular segment opening portion, the fixed disk segment opening portion and the fixed disk slot opening portion being contiguous; a movable disk having an opening passing through the movable disk with a first arcuate wall cooperating with a second arcuate wall spaced a substantially constant distance from said movable disk first arcuate wall to define a slot opening portion having a substantially constant width and cooperating with opposite walls to define an angular segment opening portion, the movable disk segment opening portion being contiguous with the movable disk slot opening portion; said movable disk being superimposed on said fixed disk with said movable disk slot opening portion lying adjacent said fixed disk slot opening portion such that rotation of said movable disk results first in superiposition of said movable disk slot opening portion and said fixed disk slot opening portion and further movement of said movable disk results in superposition of said movable-disk segment opening portion and said fixed disk segment opening thereby irst establishing a small amount of flow through said slot opening portions and gradually increasing any flow of delivered liquid as said segment openings are brought into coincidence with the flow of liquid reaching a maximum when the two segment openings are coinciding.

2. A pair of ceramic disks according to claim 1, wherein the ratio between the angular length of each segment opening portion to the angular length to each slot opening portion is 2:1.

3. A pair of ceramic disks according to claim 2 wherein each said arcuate walls extends substantially 180°.

* * * * *